April 15, 1941.　　　　G. R. GREENSLADE　　　　2,238,092
STAY BOLT TESTING DEVICE
Filed Oct. 2, 1939　　　　2 Sheets-Sheet 1
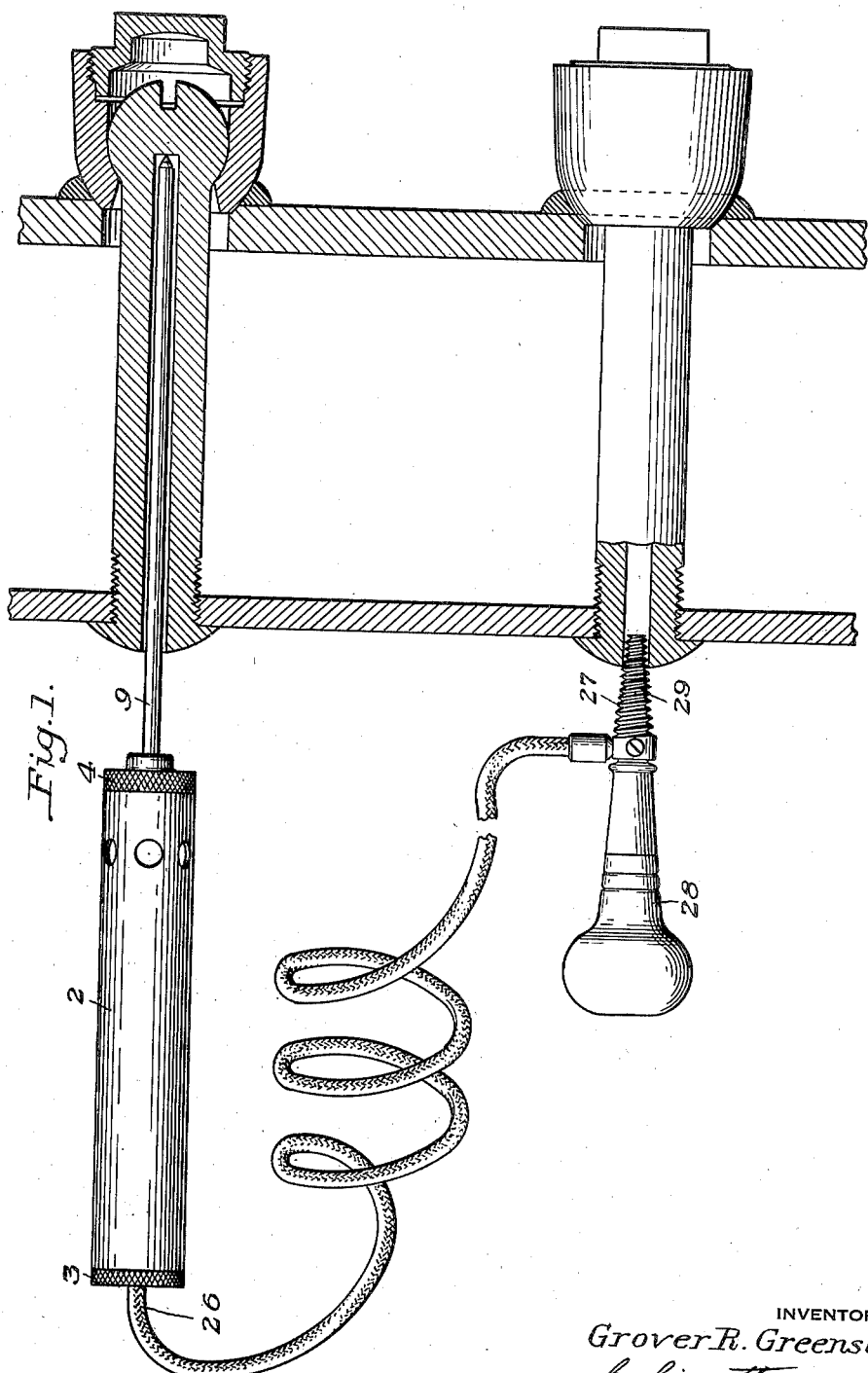
INVENTOR
Grover R. Greenslade
by his attorneys April 15, 1941.                G. R. GREENSLADE                2,238,092
                            STAY BOLT TESTING DEVICE
                             Filed Oct. 2, 1939              2 Sheets-Sheet 2
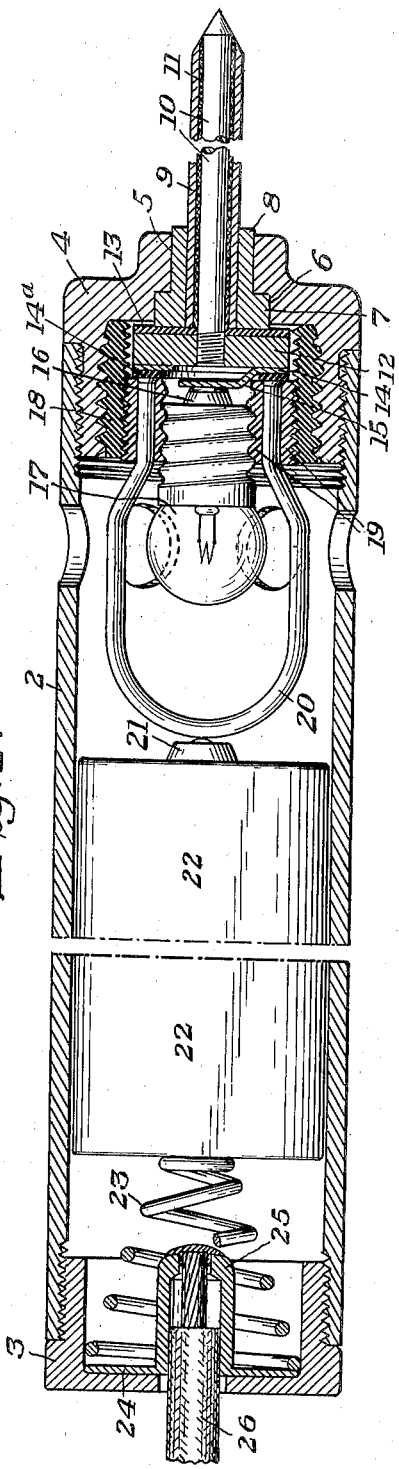
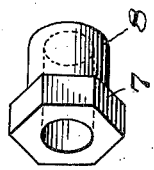
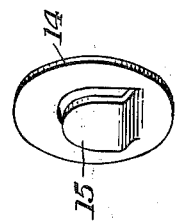
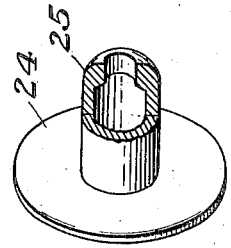
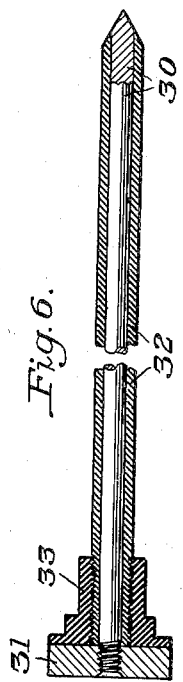
INVENTOR
Grover R. Greenslade
by his attorneys Patented Apr. 15, 1941

2,238,092

UNITED STATES PATENT OFFICE 2,238,092

STAY BOLT TESTING DEVICE

Grover R. Greenslade, Scott Township, Allegheny County, Pa., assignor to Flannery Bolt Company, Bridgeville, Pa., a corporation of Delaware Application October 2, 1939, Serial No. 297,445

10 Claims. (Cl. 175—183)

This invention relates to stay bolt testing devices and is for an improvement in a stay bolt testing device of the character shown in my prior Patent No. 1,567,728 dated December 29, 1925.

As explained in my said prior patent, locomotive boiler stay bolts are frequently provided with axially extending tell-tale holes, the purpose of which is to reveal a breakage or a defect in the bolt when the boiler is put under hydrostatic test in that when the boiler is under test water will escape from the boiler into the tell-tale hole of a defective bolt and it will flow out the fire-box end of a bolt thus revealing the presence of a defect. The Interstate Commerce Commission requires that locomotive boilers be periodically inspected, and it requires that the tell-tale holes be free of any foreign material such as might prevent the escape of water from the hole. The tester shown in my prior patent above referred to has a probe which is inserted in the tell-tale hole. This probe is an electrical circuit with an indicating device and a source of current, the other side of the source of current being grounded on the boiler, the arrangement being such that if the tip of the probe contacts the inner end of the tell-tale hole, a circuit may be completed indicating that there is no foreign material in the hole. On the other hand, if there is a deposit of foreign material in the hole so that the point does not penetrate to the end of the hole, the circuit is not completed and the inspector is thus warned to clean out the hole.

The probe shown in my prior patent comprises a handle member having a tubular probing element. Carried on the end of the tubular probing element but insulated therefrom is a tip. An insulated wire leads from the interior of the handle through the tubular probe and is soldered to this tip.

While the construction shown in my prior patent has been entirely satisfactory as a testing device, difficulty has been encountered in keeping the tips secure on the end of the tubular rod on which they are carried. In the field these testing devices are subjected to considerable abuse resulting in the tips becoming displaced or knocked off. Moreover, from continuous use the tips wear away, or become jammed in a bolt which has become corroded, and tear off and the tips have to be replaced.

According to the present invention there is provided in a testing device of the character shown in my said patent, a probe in which such a tip is not provided. The probe comprises a relatively heavy inner rod member and a surrounding sleeve, the inner rod member projecting beyond the surrounding sleeve. The surrounding sleeve is either electrically insulated from the inner rod or is formed of insulating material. In either case the sleeve protects the conducting core from being brought into conducting contact with the side walls of the hole being tested and provides a probe of the desired diameter and rigidity. As the projecting end of the inner core becomes pitted and wears down, it can be re-sharpened. The device can be re-sharpened in this way a great many times before the probe becomes too short to use and it is much more resistant to abusive handling. The present invention also provides certain other structural advantages which will be hereinafter fully described.

My invention may be readily understood by reference to the accompanying drawings in which—

Figure 1 is an elevation showing the manner of employing the testing device in the testing of hollow stay bolts;

Figure 2 is a longitudinal section through the testing device of Figure 1, the view being considerably larger than a full sized instrument;

Figure 3 is a detailed perspective view of the ground cord terminal inside the testing device;

Figure 4 is a perspective view of the contact disk which bears against the end of the light bulb;

Figure 5 is a perspective view of a bushing element on which the probe is mounted; and Figure 6 is a longitudinal transverse section through a modified form of probe.

In the drawings 2 designates a hollow metallic barrel or handle member having a metal plug 3 removably secured in one end thereof and a metal plug 4 removably screwed into the other end thereof. The end member or plug 4 is provided with a central opening 5 with an enlarged recess 6 on the inner face thereof, the recess 6 preferably being non-circular. This recess 6 receives the non-circular end 7 of a bushing member 8. The bushing member 8 is tight on the metallic sleeve 9 forming the outer shell or casing of the probe. The bushing elements 7 and 8 provide a firm support for the probe in the end member 4 so that the probe will not turn or wobble. Centrally positioned inside the tubular casing 9 is a metallic core 10 the outer end of which projects beyond the end of the casing 9, the casing 9 and the core 10 being ground off to a sharp point as illustrated in Figure 2. Around the outside of the core 10 and inside of the tubular casing 9 is a layer of insulating material 11.

This layer of insulating material preferably comprises a piece of tubular cotton loom which fits tightly about the core 10 and which is impregnated with wax. The probe is assembled by slipping the cotton loom over the core 10, tieing it on, immersing the core with the loom and the tube in molten wax, and then slipping the parts together. It will be seen of course that the loom keeps the core 10 spaced from the casing 9 and when the tool is sharpened, the loom is ground away along with the metal sleeve and core.

On the inner end of the core 10 is a thrust disk 12. An insulating disk 13 is interposed between the thrust plate 12 and the head 7 of the bushing 8 so as to maintain the electrical separation between the core and the casing. The thrust plate 12 is formed of metal. Placed against the inner end of the thrust plate 12 is a disk 14 having a tongue 15 adapted to make contact with the base terminal 16 of an electric light bulb 17. In the end member 4 is screwed an insulating liner or sleeve 18, this sleeve being internally threaded. Screwed into the sleeve 18 until it seats firmly against the insulating washer 14a is a lamp socket 19 which comprises a simple metal bushing threaded on its exterior to screw into the sleeve 18 and threaded on its interior to engage the threads on the base of the lamp bulb. Secured in the socket member 19 are opposite ends of a heavy wire yoke 20 which yoke is adapted to bear against the center pole 21 of a battery comprising one or more dry cells 22. The pole 21 of the battery is held against the yoke 20 by a compression spring 23 which makes contact with the opposite pole of the battery. This spring seats against a terminal member 24 received in the end member 3, the terminal member 24 having a central extension 25 into which one end of a flexible cable 26 is soldered. A flexible cable 26 is connected at its opposite end to a ground terminal 27, the ground terminal preferably comprising a handle 28 having a metal plug 29 thereon which plug 29 has a coarse tapered thread so that the ground terminal can be quickly and readily forced into intimate contact with a boiler stay bolt other than the ones being tested or into any other available opening.

The arrangement is such that when the grounding plug 27 is grounded to the boiler and the probe inserted in the tell-tale hole of the stay bolt, a circuit will be completed from the battery 22 through the spring 23 to the cable 26, plug 27 and the boiler to the projecting end of the core 10 and from the core 10 to the central terminal of the lamp bulb through the lamp filament to the base terminal of the lamp plug and through the yoke 20 back to the central terminal of the battery. Completion of this circuit lights the electric lamp 17 indicating that the probe tester has made contact with the end of the hole in the stay bolt. The end thrust of the probe is against the heavy metal lamp socket, while the spring contact 15 protects the end of the bulb from this thrust.

While I prefer that the probe shall comprise a central core 10 inside a metal shell 9 with an intervening layer of insulation, the modification shown in Figure 6 may be used. In this modification 30 designates the core of the probe and 31 is the thrust plate corresponding to the thrust plate 12 of Figure 2. Surrounding the core 30 is a plastic or other insulating sleeve or shell 32 which is screwed into a plastic or other insulating bushing member 33 corresponding to the member 7—8 shown in Figure 5 but which is formed of insulating instead of conducting material. In this case the insulating shell 32 keeps the core 30 from contacting the sides of the hole of the stay bolt being tested so that only the tip of the core is exposed. The insulating shell 32 of the core 30 may be simultaneously ground off from time to time to re-sharpen the point of the probe.

In both modifications the probe comprises a rigid core extending throughout the length of the probe encased in a structure which adds rigidity to the probe and which keeps the probe from making electrical contact with the interior of the hole being tested. In either arrangement the probe can be sharpened from time to time by grinding off both the casing and the point simultaneously to maintain the same relation between them, and the probe can be used until it is ground down to a length where it is no longer sufficient to reach the inner end of the hole. By using a bushing such as the bushing 7—8 of Figure 5 to mount the probe in the end member 4, the probe is securely held in place but the complete assembly can be very quickly and easily removed for the replacement of another probe whenever it is necessary to make such replacement through the wearing down of the probe or by reason of its being damaged through abuse or accident. One probe can be substituted for another in a moment's time in the field without requiring any special tools. To replace the probe it is necessary only to remove the end member 4 and by turning the yoke 20 unscrew the lamp socket, take out one probe and replace it with another, and then replace the parts which have been removed.

While I have illustrated and described certain particular embodiments of my invention, it will be understood that various changes and modifications may be made therein within the contemplation of my invention and within the scope of the following claims.

I claim as my invention:

1. A stay bolt testing device of the character described comprising a probe having a rigid conducting core member of substantially uniform diameter extending throughout the length thereof, and an insulating and protecting sleeve surrounding the core and extending throughout the greater portion of the length thereof, the tip only of the core projecting beyond the tip of said casing, the insulating and protecting sleeve being tightly fitted about the core, whereby the probe may be repeatedly sharpened simultaneously cutting away the end of the core and the end of the sleeve in such manner that the end of the probe is a cone and the tip of the core always protrudes 2. A testing device of the character described comprising a handle member and a probe member secured to the handle member, electric signalling means supported by the handle member, said probe comprising a core of substantially uniform diameter member, an insulating and protecting sleeve surrounding the core member, the tip only of the core member projecting beyond the outer end of the sleeve, said core and sleeve member being secured together for removal as a unit from the handle member.

3. A testing device of the class described comprising a hollow handle member, an end plug removably secured in one end of said handle member and having an opening therethrough, a probe member passing through said opening and having a thrust plate on the inner end thereof, means screwed into the plug member for holding said thrust plate against endwise movement, said probe comprising a conducting core and an insulating and conducting sleeve surrounding the core.

4. A testing device of the class described comprising a hollow handle member, an end plug removably secured in one end of said handle member and having an opening therethrough, a probe member passing through said opening and having a thrust plate on the inner end thereof, means screwed into the plug member for holding said thrust plate against endwise movement, said means comprising a lamp socket with an indicator lamp therein, said socket being positioned to take the end thrust on the probe, one terminal of the lamp being in conducting contact with said thrust plate there being a resilient contact element between said lamp terminal and the thrust plate.

5. A stay bolt testing device of the class described comprising a tubular handle member having a plug-like end member removably secured into one end thereof, said end member having a central well therein and having a central opening therethrough, a probe passing through said opening and having a thrust plate at its inner end received in said well, means removably screwed into said well for holding the probe against endwise movement, said probe comprising a rod-like metal core member and a surrounding sleeve.

6. A stay bolt testing device of the class described comprising a tubular handle member having a plug-like end member removably secured into one end thereof, said end member having a central well therein and having a central opening therethrough, a probe passing through said opening and having a thrust plate at its inner end received in said well, means removably screwed into said well for holding the probe against endwise movement, said probe comprising a rod-like metal core member and a surrounding sleeve, said surrounding sleeve comprising a layer of insulation and a metal tube outside said insulation.

7. A stay bolt testing device of the class described comprising a tubular handle member having a plug-like end member removably secured into one end thereof, said end member having a central well therein and having a central opening therethrough, a probe passing through said opening and having a thrust plate at its inner end received in said well, means removably screwed into said well for holding the probe against endwise movement, said probe comprising a rod-like metal core member and a surrounding sleeve, said sleeve being formed of insulating material and being substantially coextensive with the core, the tip of the core projecting beyond the outermost end of the sleeve, the inner end of the core being insulated electrically from said end member.

8. A bolt testing device of the class described comprising a tubular handle member, a plug member removably screwed into one end of the handle member and having a well therein, a lamp socket screwed into said well and insulated from said plug member and having a lamp therein, a probe carried by said plug member having a thrust plate in said well between the inner end of the well and said lamp socket and in electrical contact with the central terminal of said lamp in the socket, a metal core extending outwardly through the plug to which said thrust plate is attached, an enclosing sleeve around the core, said sleeve maintaining the core insulated from the plug and also serving to insulate the core from contact with the interior of the hole of the stay bolt in which the probe is inserted, the tip only of the core projecting beyond the end of the enclosing shell.

9. A stay bolt tester having a probe comprising a rigid core and an insulating housing extending along the core over substantially the full length thereof, said probe having a handle, and means on the probe and cooperating means within the handle to prevent longitudinal and rotational movement of said probe relative to said handle, said means being constructed to enable quick removal and replacement of the probe.

10. A stay bolt tester having a probe comprising a rigid core of conducting material and an insulating housing enclosing the core and substantially coextensive therewith, a handle in which the probe is mounted, cooperating means on the handle and probe for holding the handle and probe against relative rotation, and removable means within the handle for normally holding the probe against longitudinal movement relative to the handle.

GROVER R. GREENSLADE.